Jan. 30, 1968
J. MATTERN
3,366,955
PHASE CODED PULSE ANTI-CLUTTER RADAR PROCESSOR
Filed June 10, 1966
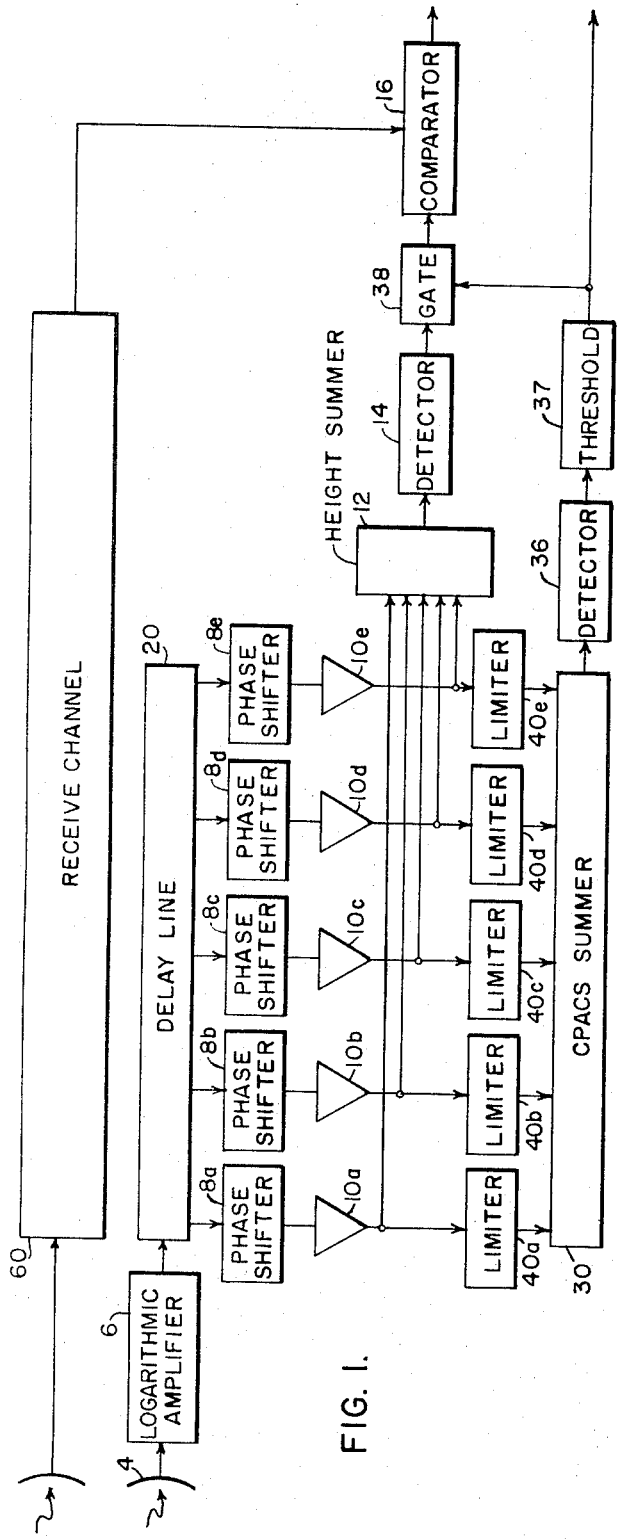
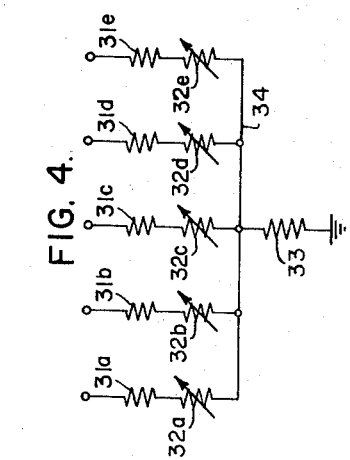
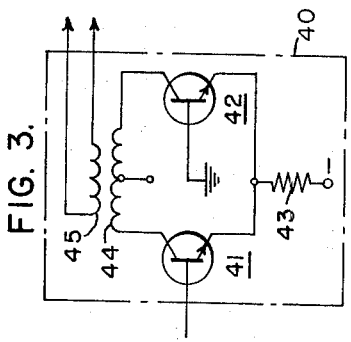
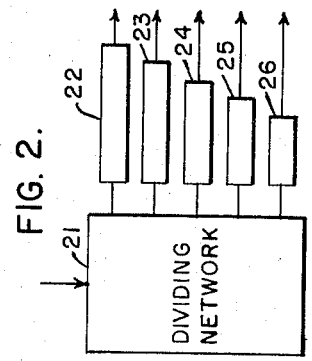
INVENTOR
John Mattern
BY *Ernest P. Klipfel*
ATTORNEY {United States Patent Office}

3,366,955
Patented Jan. 30, 1968

3,366,955
PHASE CODED PULSE ANTI-CLUTTER
RADAR PROCESSOR
John Mattern, Baltimore, Md., assignor to Westinghouse
Electric Corporation, Pittsburgh, Pa., a corporation of
Pennsylvania
Filed June 10, 1966, Ser. No. 556,609
7 Claims. (Cl. 343—13)

ABSTRACT OF THE DISCLOSURE

A phase coded pulse anti-clutter radar processor providing both log and limited outputs from a single delay line decoder. A logarithmic amplifier is placed before the delay line to limit the dynamic range on the input signals. A height summer is connected to the output components from the delay line decoder to obtain a collapsed pulse proportional to the log of the input to the delay line. The phase information required to determine the target range is independent of the amplitude of the input signals to the delay line. Hence, a limiter connects each output component from the delay line to a coded pulse anti-clutter summer.

---

The present invention relates generally to coded pulse anti-clutter radar systems and more particularly relates to apparatus for simultaneously providing height and range information of a target through a single decoder in a coded pulse anti-clutter processor of a receiver for such a radar system.

Phase coded pulse techniques are utilized to improve target detectability for aircraft within extended clutter. Such techniques synthetically generate a pulse of short duration without actually transmitting a short pulse. Hence a decrease in pulse width provides a decrease in the extended clutter return without causing power breakdown of microwave and waveguide components which would otherwise occur due to a proportional increase in peak transmitted power.

One method of synthetically generating a short pulse by pulse coding is a technique known as pulse phase coding. If, during the transmitted radar pulse, the phase of the transmitted energy is shifted in abrupt discrete intervals by 180°, the radar pulse will be pulse phase coded. The exact number of timing of the phase shifted intervals must be made in accordance with predetermined codes. Any Barker code of a predetermined number of bits may be utilized.

In the receiver clutter and chaff are greatly reduced by cancellation within the decoder but when the reflected pulse from a target is coincident with the phase code arrangement within the decoding unit, all components of the pulse are in phase with the settings of the decoding unit and the pulse is collapsed to a time of duration equal to one bit or component of the phase coded pulse.

The applicability and operation of phase coded pulse systems for various codes of numeric values such as 3, 4, 5, 7, 11 and 13 may be readily appreciated by reference to "Introduction to Radar Systems" by Merrill I. Skolnik, McGraw-Hill, dated 1962.

It is desirable to combine a pulse coded anti-clutter system with a stacked beam system so that range and height information of a target can be obtained. Such a combined system however should avoid excessive increased cost and weight which would result from additional parallel channels. At the same time, fine interpolation accuracy in the height computation should be provided.

Accordingly, it is an object of the present invention to provide an apparatus for the extraction of height information from a phase coded pulse system to allow application of coded pulse anti-clutter techniques to a three dimensional stacked beam radar.

Another object of the present invention is to provide an apparatus for combining a coded pulse anti-clutter system with a stacked beam system.

Another object of the present invention is to provide a coded pulse anti-clutter processor with height output in an economical and weight saving arrangement.

A more specific object of the present invention is to provide a single delay line decoder to simultaneously produce optimum height and coded pulse anti-clutter search outputs.

Another object of the present invention is to provide a single delay line decoder producing optimum results in both the height and search indicator outputs.

Briefly, the present invention accomplishes the above cited objects by providing both log and limited outputs from a single decoder. In order to provide constant false alarm rate against both system noise and extended clutter a hard limiter is usually placed before the delay line decoder of a conventional pulse coded anti-clutter (CPAC) processor. Unfortunately, such a limiter destroys amplitude information and hence height information. In accordance with the present invention the single limiter is replaced by a multiplicity of limiters one in each output line of the multiple bit delay line decoder. An IF (intermediate frequency) in IF out logarithmic amplifier is placed before the delay line. This limits the dynamic range of the input signals so that multi-stage limiters are not required in the delay line output circuits leading to the CPAC summer. Hence, the component outputs from the delay line decoder can be summed directly to produce the required log height output and the limiter outputs can be summed to produce the required CPACS signal.

Further objects and advantages of the present invention will be readily apparent from the following detailed description taken in conjunction with the drawing in which:

FIG. 1 is an electrical schematic block diagram of an illustrative embodiment of the present invention;

FIG. 2 is a schematic block diagram of an alternate delay line decoder for use in the embodiment of FIG. 1;

FIG. 3 is an electrical schematic diagram of a limiter for use in the embodiment of FIG. 1; and FIG. 4 is an electrical schematic diagram of a summer for use in the embodiment of FIG. 1.

In a three dimensional stacked beam radar, a receive channel is necessary for each beam. For purposes of illustration only two receive channels are shown, one in detail.

The phase of a transmitted energy pulse is shifted by 180° in abrupt discrete intervals in order to phase code the pulse to be transmitted. The exact number and timing of the phase shifted intervals is made in accordance with a predetermined code. The code utilized by the present invention will be assumed to be a 5 bit code although it is to be understood that other perfect codes for 7, 11 and 13 bits as well as others may be utilized.

The transmitted code to be detected by the receiver is preset into a delay line 20 to identify the bits in terms of their relative phase shift, that is 0° or 180°. The components of the pulse put out by the delay line 20 result in complete cancellation or a value of one except for the exact time when the reflected pulse into the delay line 20 is coincident with the decoding unit, at which time all components of the pulses are in phase and coherently add to a value of 5 units. Hence the delay line decoder 20 produces an output equivalent to short pulse operation without actually transmitting a short pulse. With a 5 bit code there is a 5 to 1 ratio between peak and sidelobes. Larger bit codes will result in further improvement in the peak to sidelobe ratio.

Height information and range information are obtained from the same channel connected to a single antenna 4. The selected antenna 4 receives the reflected pulse made up of a train of bits as determined by the selected code. A logarithmic amplifier 6 connects the reflected pulse to the delay line 20. The log amplifier 6 is of the IF (intermediate frequency) in IF out type and limits the dynamic range of the reflected pulse so that multi-stage limiters will not be required in the delay line output circuits. Phase shifters 8a through 8e are inserted in each output tap respectively of the delay line to trim the phase for both the height and CPAC output. Amplifiers 10a through 10e amplify each component output respectively to compensate for line losses occurring in the delay line.

The components of the reflected pulse from the delay line 20 which are in phase are added by a height summer 12 which collapses the pulse to provide a logarithmic amplitude signal indicative of the height of the target. The outputs of the height summers 12 in adjacent channels such as 60 pass through respective detectors 14 and are compared in a comparator 16 to provide an interpolation for more exactly determining the height of the target.

The phase information required to determine the target range is independent of the amplitude of the received reflected pulse. Hence, limiters 40a through 40e are provided in the tapped output of each component respectively of the delay line 2. The resulting components of the reflected pulse from the delay line 20 are coherently added in a summer 30 to provide a collapsed pulse of amplitude equal to the summation of the components and of width equal to the time duration of a single bit of the coded pulse. The envelope of the collapsed pulse from the summer 30 is detected by a detecter 36 and threshold 37 and normally provides a gating signal to a gate 38 to cross gate the height channel so that interpolation of the magnitude of the logarithmic summation from adjacent height summers can be compared in the comparator 16 for interpolation of the height of the target.

The conventional coded pulse anti-clutter receiver utilizes only phase information and consequently its output cannot provide the fine height information. In accordance with the present invention however the amplitude information is preserved. The collapsed pulse occurring at the output of the height summing circuit 12 is proportional to the log of the input to the delay line 20. The collapsed pulse occurring at the output of the coded pulse anti-clutter summing circuit 30 contains only the desired phase information. Thus, a single decoder in each channel provides the dual functions required by a stacked beam radar.

An alternate arrangement for the delay line decoder is illustrated in FIG. 2. A network 21 divides the signal from the logarithmic amplifier into each of a plurality of delay lines 22 through 26. The multiple delay lines are each ultimately connected to the height summer 12 for summation of the logarithmic amplitude of each of the components and are also connected to limiters 40 and the coded pulse summer 30 for extraction of the phase information.

FIG. 3 illustrates a representative limiter 40. First and second transistors 41 and 42 are emitter coupled through resistor 43 to a negative biasing potential. The component of the reflected signal emitted by the delay line 20 is connected to the base of transistor 41. A positive potential of the base will render the transistor 41 more conductive than transistor 42, with its base electrode grounded. The transistors will provide equal but opposite signals to the tapped primary winding 44 to cancel spurious signals. However, when the magnitude of the component received at the base electrode of the transistor 41 exceeds a predetermined value, that is when transistor 42 is cut-off, the secondary winding 45 will provide a fixed output pulse.

A representative summer is illustrated in FIG. 4. Each component of the reflected pulse from the delay line 20 is received respectively by individual fixed resistors 31a through 31e and variable resistors 32a through 32e. The variable resistors 32 allow trimming of the amplitude. The received components are summed across a fixed resistor 33 connected to a point of reference potential or ground. An output indicative of the summation of the components is provided at 34.

The present invention provides sizable cost savings and weight savings in a multi-beam three dimensional stacked beam radar. A single delay line decoder in each channel provides simultaneous height signals and search signals. The amplitude information of the received pulse is maintained for height summation and then each component of the pulse from the delay line 20 is limited prior to insertion into the CPACS summer for the necessary phase information to determine the range.

A second channel having an additional decoder for each antenna beam is not necessary. At the same time interpolation accuracy in the height computation is maintained since the reflected wave is first decoded before interpolation. If the received signal for the height channel were demodulated without first decoding it the system noise and extended clutter would affect the accuracy of the height computation.

While the present invention has been described with a degree of particularity for the purposes of illustration, it is to be understood that all modifications, substitutions and alterations within the spirit and scope of the present invention are herein meant to be included.

I claim as my invention:

1. In a phase coded pulse anti-clutter radar processor including delay line means for correlating the components of the reflected pulse from a target with the code set into the delay line means to provide components of said pulse which are in phase, the combination comprising; logarithmic amplifier means for limiting the dynamic range of the reflected pulse fed to said delay line means; a first summer connected to receive the components of the pulse from said delay line means for collapsing said pulse to provide an output proportional to the logarithm of the reflected pulse received by said delay line means; a second summer; and means interconnecting said second summer to said delay line means for limiting the amplitude of the components of said pulse to said second summer; said second summer coherently adding each component thereof and providing a collapsed output pulse having phase information indicative of target range.

2. A multiple stacked beam radar processor with a channel for each beam, each channel including the apparatus of claim 1; and means for comparing the output from each first summer to interpolate the height position of said target.

3. The apparatus of claim 1 wherein amplifier means amplify each component output from said delay line means to compensate for at least line losses accruing in said delay line.

4. The apparatus of claim 1 wherein means are operably connected to said delay line means for trimming the phase of each component of said pulse from said delay line means.

5. The apparatus of claim 1 wherein said delay line means includes a tapped delay line with a component of said pulse from said delay line appearing at each tap.

6. The apparatus of claim 2 wherein each channel includes threshold means for sensing the magnitude of the output of said second summing circuit; and means for cross gating the output from said first summer in response to said threshold being exceeded.

7. Apparatus for the extraction of height information from a coded pulse anti-clutter radar receiver channel comprising, in combination; delay line means for correlating the components of the reflected pulse from a target with the code set into the delay line means to provide components of said pulse which are in phase; log amplifier means for limiting the dynamic range of the reflected pulse fed to said delay line means; first summing means connected to said delay line means for collapsing said pulse and providing an output functionally related to the log of said reflected pulse to provide height information on the target; second summing means for coherently adding the components of said pulse from said time delay means to provide phase information indicative of the target range; and means connecting said delay line means to said second summing means for limiting the magnitude of each component of said pulse from said time delay means.

References Cited

UNITED STATES PATENTS

| | | | |
|---|---|---|---|
| 3,064,252 | 11/1962 | Varela | 343—12 |
| 3,072,903 | 1/1963 | Meyer | 343—12 |
| 3,090,953 | 5/1963 | Frank | 343—17.2 |
| 3,155,912 | 11/1964 | Applebaum et al. | 343—17.1 X |
| 3,161,870 | 12/1964 | Pincoffs | 343—12 |
| 3,217,324 | 11/1965 | Adamsbaum et al. | 343—17.2 |
| 3,274,593 | 9/1966 | Varela et al. | 343—12 |
| 3,307,185 | 2/1967 | Mefford | 343—17.1 |

OTHER REFERENCES

Skolnik, Radar Systems, McGraw-Hill (1962) pp. 457–458, pp. 497–498, p. 539.

RODNEY D. BENNETT, *Primary Examiner.*

C. L. WHITHAM, *Assistant Examiner.*